(12) United States Patent
Chawla et al.

(10) Patent No.: US 7,043,254 B2
(45) Date of Patent: May 9, 2006

(54) METHOD FOR DETERMINING ORGANIZATION PARAMETERS IN A WIRELESS COMMUNICATION SYSTEM

(75) Inventors: Kapil K. Chawla, Middletown, NJ (US); Michael Jeffrey Dunn, Issaquh, WA (US); Reinaldo A. Valenzuela, Holmdel, NJ (US)

(73) Assignee: Cingular Wireless II, LLC, Atlanta, GA (US)

( * ) Notice: Subject to any disclaimer, the term of this patent is extended or adjusted under 35 U.S.C. 154(b) by 585 days.

(21) Appl. No.: 10/082,402

(22) Filed: Feb. 25, 2002

(65) Prior Publication Data

US 2002/0142788 A1 Oct. 3, 2002

Related U.S. Application Data

(62) Division of application No. 08/628,214, filed on Apr. 4, 1996.

(51) Int. Cl.
*H04Q 7/20* (2006.01)
*H04Q 7/38* (2006.01)

(52) U.S. Cl. ............... 455/456.1; 455/63.1; 455/67.11; 455/63.2; 455/69; 455/423

(58) Field of Classification Search ... 455/456.1–456.6, 455/457, 443, 403, 424, 423, 500, 426.1, 455/426.2, 436–444, 67.11, 522, 63.1, 550, 455/63.2, 422.1, 446, 447, 450.1, 517, 524, 455/62, 63, 67.1, 436.1, 437, 440, 452.1, 455/509, 512, 513, 67.3, 67.6
See application file for complete search history.

(56) References Cited

U.S. PATENT DOCUMENTS 4,736,453 A 4/1988 Schloemer
4,918,437 A 4/1990 Jasinski et al.
4,965,850 A 10/1990 Schloemer (Continued)

FOREIGN PATENT DOCUMENTS

| CA | 2110578 | 12/1992 |
| CA | 2097587 | 4/1993 |
| EP | 0 696 151 A2 | 10/1995 |

(Continued)

OTHER PUBLICATIONS

Wolfgang, Larry D., et al., eds., "The ARRL Handbook for Radio Arnateurs," 1990, pp. 22–2–22–18, American Radio Relay League, Newington, Connecticut.

(Continued)

*Primary Examiner*—Keith T. Ferguson
(74) *Attorney, Agent, or Firm*—Perkins Coie LLP

(57) ABSTRACT

Automated adjustment of system organization parameters in a wireless communication system is provided by determining the parameter settings using a characterization of signal propagation of the system's coverage area. This characterization is based on measurements of path loss-related characteristics by the system's base stations and wireless terminals. An exemplary path loss-related characteristic is path loss as determined by measuring received signal strength (RSS) at wireless terminals based on signals transmitted at known powers by a plurality of the system's base stations. It is possible for the wireless terminals to take measurement while operating in the coverage area, whether idle or during communication with the system, and for such terminals to be associated with the system's subscribers. A resulting characterization of signal propagation in the coverage area based on the measured path loss-related characteristic can then be used to determine a variety of parameter settings.

34 Claims, 2 Drawing Sheets

U.S. PATENT DOCUMENTS

| | | |
|---|---|---|
| 5,023,900 A | 6/1991 | Tayloe |
| 5,040,238 A | 8/1991 | Comroe et al. |
| 5,093,924 A | 3/1992 | Toshiyuki et al. |
| 5,095,500 A | 3/1992 | Tayloe et al. |
| 5,109,529 A | 4/1992 | Akaiwa |
| 5,134,709 A | 7/1992 | Bi et al. |
| 5,148,548 A | 9/1992 | Meche et al. |
| 5,157,709 A | 10/1992 | Ohteru |
| 5,179,722 A | 1/1993 | Gunmar et al. |
| 5,203,008 A | 4/1993 | Yasuda et al. |
| 5,212,831 A | 5/1993 | Chuang et al. |
| 5,241,685 A | 8/1993 | Bodin et al. |
| 5,241,690 A | 8/1993 | Larsson et al. |
| 5,276,730 A | 1/1994 | Cimini, Jr. et al. |
| 5,287,544 A | 2/1994 | Menich et al. |
| 5,293,640 A | 3/1994 | Gunmar et al. |
| 5,355,522 A | 10/1994 | Demange |
| 5,361,399 A | 11/1994 | Linquist et al. |
| 5,375,123 A | 12/1994 | Andersson et al. |
| 5,430,775 A | 7/1995 | Fulghum et al. |
| 5,442,804 A | 8/1995 | Gunmar et al. |
| 5,442,806 A | 8/1995 | Barber et al. |
| 5,446,756 A | 8/1995 | Mallinckrodt |
| 5,457,680 A | 10/1995 | Kamm et al. |
| 5,465,390 A | 11/1995 | Cohen |
| 5,465,399 A | 11/1995 | Oberholtzer et al. |
| 5,475,868 A | 12/1995 | Duque-Anton et al. |
| 5,475,870 A | 12/1995 | Weaver, Jr. et al. |
| 5,487,174 A | 1/1996 | Persson |
| 5,491,837 A | 2/1996 | Haartsen |
| 5,513,246 A * | 4/1996 | Jonsson et al. ............. 455/443 |
| 5,574,974 A | 11/1996 | Almgren et al. |
| 5,715,516 A | 2/1998 | Howard et al. |
| 5,878,328 A * | 3/1999 | Chawla et al. ........... 455/67.11 |

FOREIGN PATENT DOCUMENTS

| | | |
|---|---|---|
| EP | 0 752 766 A1 | 8/1996 |
| GB | 2 236 457 A | 4/1991 |
| GB | 2 269 298 A | 2/1994 |
| JP | 4-212529 | 8/1992 |
| JP | 7-74727 | 3/1995 |
| JP | 7-245784 | 9/1995 |
| WO | WO 90/10341 | 9/1990 |
| WO | WO 95/26598 A2 | 10/1995 |
| WO | WO 96/09696 | 3/1996 |

OTHER PUBLICATIONS

Almgren, M., et al., "Adaptive Channel Allocation in TACS," GLOBECOMM '95: communications for global harmony: IEEE Global Telecommunications Conference, Singapore, Nov. 14–16, 1995, vol. 2, pp. 1517–1521, Institute of Electrical and Electronics Engineers, Piscataway, New Jersey.

Andersen J.B. et al., "Propagation Measurements and Models for Wireless Communications Channels," IEEE Communications Magazine, vol. 33, Jan. 1995.

The American Radio Relay League, "Radio Frequencies and Propagation," The ARRL Handbook for Radio Amateurs. 1991.

* cited by examiner

METHOD FOR DETERMINING ORGANIZATION PARAMETERS IN A WIRELESS COMMUNICATION SYSTEM

CROSS-REFERENCE TO RELATED CASE

This application is a divisional of U.S. patent application Ser. No. 08/628,214, filed Apr. 4, 1996, and is related to U.S. patent application Ser. No. 08/575,974, filed Dec. 21, 1995, both of which are incorporated herein by reference in their entirety.

FIELD OF THE INVENTION

The invention relates to wireless communication systems in general and more particularly to the organization of such systems.

BACKGROUND OF THE INVENTION

Conventional radio telephone systems such as cellular systems use cell-sites having co-located transmitters and receivers to cover geographical regions referred to as cells. Several cell-sites disposed within a particular geographic area are coupled to a master controller called a mobile telephone switching office (MTSO). The MTSO controls the cell-sites and provides an interface connection to the public switched telephone network (PSTN).

Each conventional cell-site uses pre-assigned channel sets to communicate with mobile units in a service area covered by the cell-site. Each channel set typically includes a pair of carrier frequencies with each carrier frequency being used for respective up-link or down-link communications with a mobile unit. Neighboring cell-sites use different channel sets to avoid interference on the same channel and adjacent channels between adjacent service areas.

Conventional cellular systems provide mobility to a subscriber through a procedure referred to as hand-off. According to this procedure, geographically adjacent cell-sites are considered to be neighbor cell-sites. A neighbor cell-site is the cell-site to which a call can be transferred as a mobile unit traverses a current cell-site boundary. A data table called a neighbor list specifies the cell-sites that can receive a hand-off from a particular cell-site. In addition, to increase the simultaneous communication capacity of a system, channel reuse is employed where two sufficiently distant base stations simultaneously use the same channel.

The channel sets and neighbor lists assigned to particular cell-sites as well as cell-site transmission powers are examples of system organization parameters that define the operating characteristics of the system. Such parameters are typically determined using propagation models prior to installation of a system. After installation, the system coverage area produced by the determined parameter settings is verified by field testing. During a typical field test, a mobile test unit is moved throughout the service area while the base stations and test unit transmit respective test frequencies. As the test unit is moved from one sampling location to the next, the respective signal strength of the test frequencies and the corresponding geographic location is detected at the respective base stations and test unit to verify that the system can provide service to the intended coverage area.

Typical wireless communication systems do not have the capability to automatically identify and adapt parameter settings to such changes. Environmental changes that often require parameters setting adjustments include the construction of structures in the coverage area, such as a building in an outdoor cellular system or added walls in an indoor system, or the installation of another wireless communication system in close proximity to the current system. Such changes could degrade system performance and often require an installer to perform computer modeling of the coverage area again to determine the proper parameters settings.

A method that possesses the limited ability of determining frequency channels used by respective cell-sites is described in M. Almgren et al., "Adaptive Channel Allocation in TACS", *IEEE Global Telecommunication Conference Record*, pp. 1517–1521 (1995), which is incorporated by reference herein. According to this method, each cell-site monitors received signal strength (RSS) on respective sets of channels over time and uses the channels for establishing communications that have the lowest interference.

Also, some time division multiple access (TDMA) systems, such as those adhering to the Telecommunication Industry Association Interim Standard 136 (TIA IS-136 standard), have the limited ability to dynamically allocate channels during operation of the systems to achieve greater spectral efficiency and communication capacity. In such systems, a cell-site can request an idle mobile unit to measure the RSS or bit error rate of different communication channels and transmit the measurement information back to the cell-site. Such RSS or bit error rate information indicates the interference on the respective channels. Communication can then be established with the mobile unit using the channel with the lowest interference. However, such a dynamic allocation technique is limited to channel allocation for the respective mobile unit that provides the RSS information.

Thus, a need exists for a radio telephone system having enhanced spectral efficiency that employs a substantially automated determination of system organization parameters and that is capable of adjusting for environmental changes.

SUMMARY OF THE INVENTION

The invention provides a level of automation in determining system organization parameters in a wireless communication system by advantageously determining a signal propagation characterization of the system's coverage area. This signal propagation characterization is based on measurements of a path loss-related characteristic between the system's base stations and a plurality of wireless terminals operating throughout the coverage area. Path loss-related characteristic refers to a measurable characteristic that is partially or fully based on path loss and includes, for example, path loss, bit error rate, word error rate and frame error rate. Path loss refers to the reduction in power of a signal transmitted between two locations. Coverage area refers to the geographic area in which a wireless terminal can communicate with the base stations without substantial interruption.

In accordance with the invention, it is possible for the wireless terminals associated with subscribers located within the coverage area to provide the measurements for the path loss-related characteristic. Such a characteristic can be path loss determined by the wireless terminals measuring RSS of signals transmitted at known power levels by the system's base stations. Since the base stations are transmitting at known power levels, the path losses between the base stations and the respective locations of the measuring wireless terminals can be determined based on the differences between the known transmission powers and the RSS measurements. The determined path losses are used to form the signal propagation characterization which can be used to predict the signal strength received at locations of the measuring wireless terminals based on a corresponding increase or decrease in base station transmission power. Moreover, the individual and cumulative interference characteristics of signals transmitted on the same or adjacent communication channels between the respective base stations and the locations of the measuring wireless terminals can also be obtained from such a characterization.

Although some conventional systems posses the limited capability of identifying a single particular parameter setting with respect to specific mobile unit, the novel and unobvious use of the signal propagation characterization of the coverage area in this invention advantageously enables the determination of a variety of important system-based settings which can affect multiple wireless terminals. Such a signal propagation characterization can be determined from measurements taken over an extended period of time. Exemplary parameter settings that can be determined from this characterization include neighbor lists, the sets of base stations which can reuse channels and base station transmission power settings including such settings upon the addition or removal of base stations. For example, base station transmission power settings can be determined directly using the path loss characteristics. The determination of neighbor lists, and those base stations that can efficiently reuse the same or adjacent channels can be performed using isolation values derived from the predicted cumulative interference effects. Isolation values characterize the relative signal isolation of signals originating from a particular base station or its service area from interfering signals originating from another base station and service area.

Since the path loss-related characteristic measurements can be obtained during normal operation of a wireless communication system, the parameter settings can advantageously be updated automatically. Thus, the system does not require costly re-modeling and field testing as changes occur in the coverage area or system that effect the signal propagation. The invention also avoids the complex and labor intensive recording of geographic location information that is typically required during the field testing of conventional installation techniques.

Additional features and advantages of the present invention will become more readily apparent from the following detailed description and accompanying drawings.

DETAILED DESCRIPTION

The invention concerns a technique for determining a system organization parameter setting in a wireless communication system using a characterization of signal propagation of the system's coverage area. The signal propagation characterization is based on measurements of a path loss-related characteristic between the system's base stations and wireless terminals operating within the coverage area. System organization parameter refers to a system characteristic that can be determined during the operation of the communication system including wireless terminal access parameters.

Exemplary system organization parameters that can be determined according to the invention include neighbor lists, base stations that can reuse channels, wireless terminal access parameters such as wireless terminal transmission power settings, and base station transmission power settings including such settings upon the addition or removal of base stations from the system. Upon determining a parameter setting, the setting can be used by the system in establishing communications with wireless terminals in the coverage area However, it should be readily understood that the parameter determination need not be made prior to the establishment of each communication, but can be made at the time of the system installation or intermittently during the operation of the system.

The signal propagation characterization used to determine the parameter settings can be in the form of a table, two or multi-dimension matrix or other mathematical expression of a plurality of the path loss-related characteristics that facilitates prediction of, for example, received signal strength or interference at locations throughout the coverage area. Path loss-related characteristic refers to a measurable characteristic that partially or fully based on path loss and includes, for example, path loss, bit error rate, word error rate and frame error rate. Path loss refers to the reduction in power of a signal transmitted between two locations. Coverage area refers to the geographic area in which a wireless terminal can communicate with the base stations of the system without substantial interruption. In determining the signal propagation characterization, the path loss-related characteristic measurements can be taken over an extended period of time during operation of the system. Path loss, an exemplary path loss-related characteristic, can be determined from the difference between known transmission powers of a plurality of the system's base stations and the corresponding received signal strengths measured by a plurality of wireless terminals at different locations in the coverage area.

Figure 1:
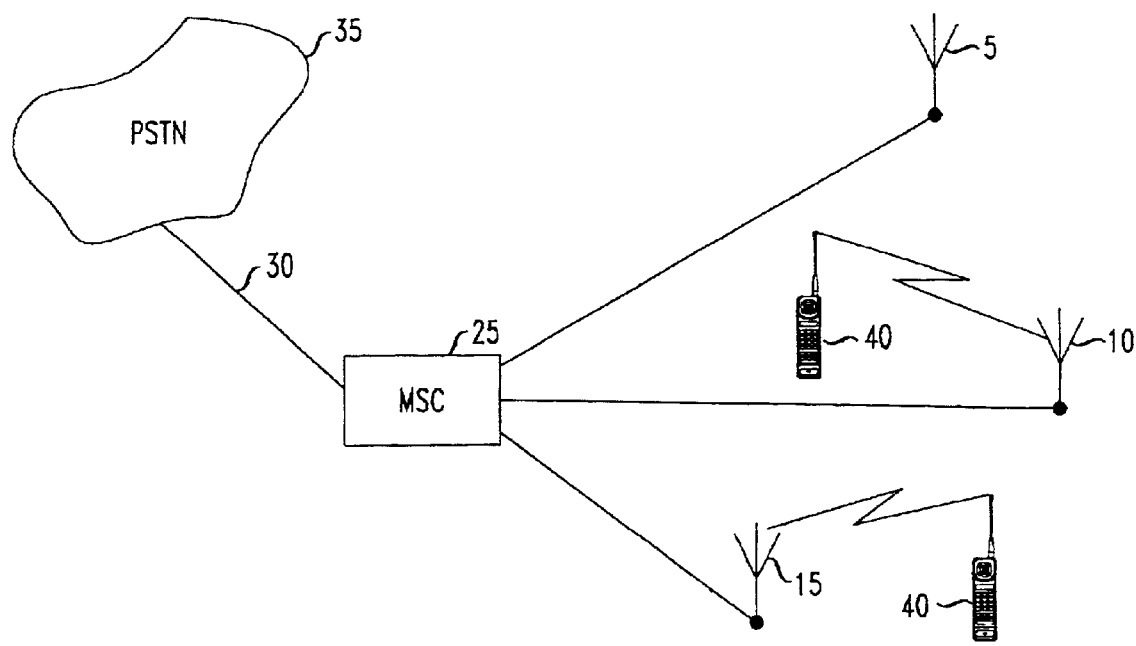
FIG. 1 illustrates a schematic block diagram of an exemplary wireless communication system having at least one system organization parameter determined in accordance with the invention.

An exemplary wireless communication system 1 having a system organization parameter determined in accordance with the invention is shown in FIG. 1. The system includes three base stations 5, 10 and 15 (5–15) connected to a mobile switching center (MSC) 25. The MSC 25 is connected to a public switched telephone network (PSTN) 35 by a suitable trunk 30. If the system 1 is an indoor or outdoor system with a relatively small coverage area, such as in an office building or a campus, then the MSC 25 can alternatively be connected to the PSTN via a private branch exchange (PBX).

The MSC 25 is responsible for routing calls between wireless terminals 40 and the respective base stations 5–15 and to the PSTN 35. For small coverage area applications, suitable MSC's and base stations include, for example, small MSC devices manufactured by Celcore and microcells produced by Lucent Technologies, Inc., respectively. For larger coverage area applications, exemplary MSC and base stations include those manufactured by wireless infrastructure manufacturers such as Lucent Technologies, Inc. The method of wireless communication is not critical to practicing the invention and can be, for example, digital communications techniques including code division multiple access (CDMA) schemes or TDMA schemes such as a TDMA scheme in accordance with the TIA IS-136 standard as well as conventional analog techniques.

Figure 2:
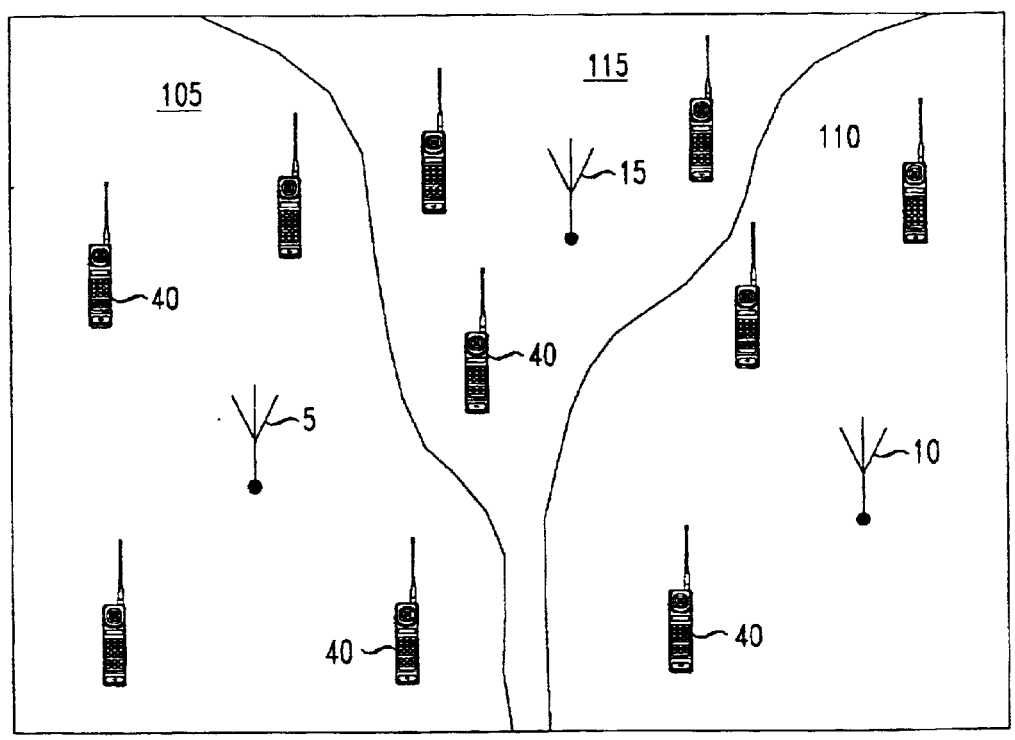
FIG. 2 illustrates a schematic block diagram of base stations in FIG. 1 arranged to provide service to a coverage area.

FIG. 2 shows the base stations 5–15 of FIG. 1 arranged to provide service to an intended rectangular coverage area 100. It is possible for such a system coverage area to be, for example, 100 m by 200 m to provide wireless communication, such as cellular communication service, to a floor of an office building. The size and shape of the coverage area and the number of positioned base stations is not critical to practicing the invention. Although the depicted coverage area 100 could represent an office building floor, it should be readily understood that the technique of the invention is useful in a variety of wireless systems including, for example, other indoor systems such as those providing service to multiple floors of an office building, airport facilities or shopping malls, and in outdoor systems providing service to a campus or larger systems such as conventional cellular telephone systems as well as PCS systems.

Each of the base stations 5, 10 and 15 provides communications to the wireless terminals 40 in respective service areas 105, 110 and 115 (105–115). The sizes of the exemplary service areas 105–115 are different due to the respective transmission powers of the base stations 5–15 and the environment in which the base stations 5–15 are operating. Overlap regions (not shown) exist between the service areas 105–115 to enable hand-offs between adjacent base stations to provide substantially uninterrupted communications of a wireless terminal as it travels across service area boundaries. Suitable overlap regions include those used in conventional wireless systems and have not been shown for ease of illustration.

An exemplary method for determining system organization parameters for the system 1 of FIGS. 1 and 2 in accordance with the invention, will be described with respect to path loss based on RSS measurements taken by the wireless terminals 40 of signals transmitted at a known power by the base stations 5–15. Such path loss-related characteristic measurements are for illustration purposes only, and it is alternatively possible in accordance with the invention, to employ other path loss-related characteristics measurements, including bit, word or frame error rates, or for such measurements to be taken by the base stations 5–15 based on signals transmitted by the wireless terminals 40.

According to the exemplary method, RSS measurement data is collected by wireless terminals 40 based on signals transmitted by the respective base stations 5–15. Such collected data can then be transmitted to at least one of the base stations 5–15. It is possible for a wireless terminal 40 to transmit data regarding a RSS measurement to the corresponding base station that provides service to that terminal's location. The RSS data can be transmitted by the wireless terminals 40 at times, for example, when the terminal is activated and registers with the base station, responds to a page, originates a call, and/or intermittently during a call or otherwise. Several current digital communication standards include provisions for wireless terminals to make such measurements, such as the mobile assisted hand-off (MAHO) and mobile assisted channel allocation (MACA) features of the TIA IS-136 standard. It is possible for a wireless terminal 40 to be, for example, mobile units, such as cellular or PCS telephones or portable wireless modems for laptop computers or personal digital assistants (PDAs), or stationary units, such as wireless modems associated with desktop computers.

It is possible for the base stations 5–15 to transmit test signals at respective beacon frequencies to provide the reference signals for the RSS measurements taken by the wireless terminals 40. The beacon frequencies employed by the base stations 5–15 are frequencies not used by other base stations in the vicinity, and correspondingly, provide identification of the source base stations for the test signals used for RSS measurements. In the alternative, a single beacon frequency can be employed for the test signal by he base stations which transmit the signal at respective timing intervals and in a particular sequence to indicate the identities of the respective source base stations. The use of beacon frequency signals for RSS measurements is not meant to be a limitation on the invention and other techniques can be employed to differentiate the sources of the signals to be detected by the wireless terminals 40.

Provided in the following Tables 1-1 to 1-3 are lists of exemplary signal strength measurements reported by the wireless terminals 40 to the corresponding servicing base stations 5–15 servicing their location. A wireless terminal reference number appears in the left column of Tables 1-1 to 1-3 for ease of discussion but such reference numbers are not required for operation of the invention. The data in Table 1-1 corresponds to RSS data from 18 different wireless terminals 40 which are not all depicted in the service area 105 in FIG. 2 for ease of illustration. The RSS data in Tables 1-2 and 1-3 are from 18 and 26 other wireless terminals 40 located in the corresponding service areas.

TABLE 1-1

RSS Report From Wireless Terminals in Service Area 105

| Location of Wireless Terminal Ref. No. | RSS from base station 5 (dBm) | RSS from base station 10 (dBm) | RSS from base station 15 (dBm) |
|---|---|---|---|
| 1 | −60 | −114 | −100 |
| 2 | −32 | −109 | −95 |
| 3 | −32 | −103 | −90 |
| 4 | −60 | −97 | −86 |
| 5 | −77 | −88 | −83 |
| 6 | −77 | −88 | −72 |
| 7 | −60 | −97 | −76 |
| 8 | −32 | −103 | −83 |
| 9 | −32 | −109 | −90 |
| 10 | −60 | −114 | −96 |
| 11 | −70 | −115 | −93 |
| 12 | −60 | −110 | −86 |
| 13 | −60 | −105 | −76 |
| 14 | −69 | −98 | −65 |
| 15 | −76 | −107 | −72 |
| 16 | −77 | −112 | −83 |
| 17 | −81 | −116 | −92 |
| 18 | −91 | −118 | −92 |

TABLE 1-2

RSS Report From Wireless Terminals in Service Area 110

| Location of Wireless Terminal Ref. No. | From base station 5 (dBm) | From base station 10 (dBm) | From base station 15 (dBm) |
|---|---|---|---|
| 19 | −88 | −77 | −83 |
| 20 | −97 | −60 | −86 |
| 21 | −103 | −32 | −90 |
| 22 | −109 | −32 | −95 |
| 23 | −114 | −60 | −10 |
| 24 | −114 | −60 | −96 |
| 25 | −109 | −32 | −90 |
| 26 | −103 | −32 | −83 |
| 27 | −97 | −60 | −76 |
| 28 | −88 | −77 | −72 |
| 29 | −98 | −70 | −65 |

TABLE 1-2-continued

RSS Report From Wireless Terminals in Service Area 110

| Location of Wireless Terminal Ref. No. | From base station 5 (dBm) | From base station 10 (dBm) | From base station 15 (dBm) |
|---|---|---|---|
| 30 | −105 | −60 | −76 |
| 31 | −110 | −60 | −86 |
| 32 | −115 | −70 | −93 |
| 33 | −116 | −81 | −92 |
| 34 | −112 | −77 | −83 |
| 35 | −107 | −77 | −72 |
| 36 | −118 | −92 | −93 |

TABLE 1-3

RSS Report From Wireless Terminals in Service Area 115

| Location of Wireless Terminal Ref. No. | RSS from base station 5 (dBm) | RSS from base station 10 (dBm) | RSS from base station 15 (dBm) |
|---|---|---|---|
| 37 | −77 | −88 | −83 |
| 38 | −88 | −77 | −83 |
| 39 | −88 | −77 | −72 |
| 40 | −77 | −88 | −72 |
| 41 | −70 | −98 | −65 |
| 42 | −81 | −91 | −55 |
| 43 | −91 | −81 | −55 |
| 44 | −98 | −70 | −65 |
| 45 | −112 | −77 | −83 |
| 46 | −107 | −77 | −72 |
| 47 | −101 | −81 | −55 |
| 48 | −95 | −88 | −27 |
| 49 | −88 | −95 | −27 |
| 50 | −81 | −101 | −55 |
| 51 | −77 | −107 | −72 |
| 52 | −77 | −112 | −83 |
| 53 | −88 | −114 | −83 |
| 54 | −88 | −109 | −72 |
| 55 | −91 | −105 | −55 |
| 56 | −95 | −100 | −27 |
| 57 | −100 | −95 | −27 |
| 58 | −105 | −91 | −55 |
| 59 | −109 | −88 | −72 |
| 60 | −114 | −88 | −83 |
| 61 | −91 | −118 | −92 |
| 62 | −118 | −91 | −92 |

Actual received power measurements by a wireless terminal 40 would be limited by the direction capabilities of that wireless terminal. Thus, high power readings would be clipped to the upper limit of the receiver measurement range and, likewise, the lower power levels would be limited by the "noise floor" of the terminal.

Each row in the Tables 1-1, 1-2 and 1-3 corresponds to measurements that are substantially taken at a location in the coverage area by a respective wireless terminal 40. It is possible for the location to be a respective region of a size that is partially based on the size of the base service areas. For instance in a large outdoor system, such as a conventional cellular telephone system, the location can be as tens of square meters, while in an indoor system, such as in an office building, a location can be as small as a quarter of a square meter.

Moreover, it is not critical that all RSS measurements made by a particular wireless terminal 40 include data for signals transmitted by all the respective base stations. It is possible for RSS data to be collected at a particular wireless terminal location from less than the total number of base stations. The number of RSS measurements that should be used in determining a system organization parameter is partially based on the parameter to be determined and is described in greater detail below.

The RSS data contained in Tables 1-1, 1-2 and 1-3 along with the known base station settings provide a characterization of the path loss between the wireless terminal locations where the measurements were collected and the base stations that generated the signals being measured. A path loss L can be determined from the signal power $S_1$ received by a wireless terminal 40 according to equation (A): $L=S_2-S_1+G_{base}+G_{term}$, where $S_2$ is the base station transmission power and $G_{base}$ and $G_{term}$ are the base station and wireless terminal nominal antenna gains, respectively. Antenna gains $G_{term}$ of conventional wireless terminals are typically in the range of approximately 0 to 3 dB for onmi-directional antennas, and antenna gains for conventional cellular telephone base stations $G_{base}$ are often on the order of 10 dB. Base station antenna gains $G_{base}$ for smaller wireless communication systems such as indoor systems can, for example, be in the range of approximately 0 to 3 dB.

The path loss information enables the prediction of signal strengths that would be received by a wireless terminal location based on different base station transmission power settings. Moreover, the cumulative predictions of received signal strengths at a location from different base stations enable the determination of interference characteristics in the coverage area 100 as is described in greater detail below with regard to FIG. 3.

The Tables 1-1, 1-2 and 1-3 include data for 62 locations in the coverage area for discussion purposes only. However, a sufficiently large number of RSS readings from different locations should be taken in accordance with the invention to provide a substantially accurate representation of the path losses between the base stations 5–15 and regions of the coverage area 100 to enable determination of the system parameter. If too few RSS measurements were used in determining a parameter, then an inadequate characterization of the coverage area could result which can lead to an inaccurate parameter setting determination. It is possible for the number of RSS readings taken at corresponding locations in a base station service area to be, for example, on the order of several hundreds to several thousands.

Thus, in an exemplary outdoor system with relatively high communication traffic, it is possible to take a sufficiently large number of RSS data measurements for determination of a parameter setting approximately every few minutes or hours. In contrast, in an exemplary indoor system with a limited number of users, such as fewer than ten, it can take several days to obtain a sufficient number of RSS data measurements to adequately characterize the signal propagation in the coverage area to determine a parameter setting or adjustment. Further, it is advantageous to collect RSS data intermittently, whether, periodically or otherwise, during system operation to detect and adjust a parameter setting as required.

The unique path loss characterization obtained from the RSS measurements enables determination of a variety of important parameter settings including transmission power, isolation values, neighbor lists, the base stations that can reuse channels, wireless terminal access parameters and the transmission power for the addition or removal of base stations in the system 1. A description of the determination of the previously listed parameters follows. However, these parameter determinations are representative of the parameters that can be determined in accordance with the invention and not exhaustive and are not intended to be a limitation of the invention.

I. Base Station Power Level Settings

The signal strength that would be received at a coverage area location from a signal transmitted by one of the base stations 5–15 can conveniently be determined based on equation (B): $S_1=S_2-L+G_{base}+G_{term}$. Since the nominal antenna gains $G_{base}+G_{term}$ and path loss L can be considered constant, then the received signal strength $S_1$ at a location in a service area by a wireless terminal 40 is directly proportional to the transmitted signal power $S_2$.

According to equation (B), a relative change in transmission signal power $S_2$ will result in a corresponding change in the received signal strength $S_1$ at that location. Thus, the signal strength $S_{1New}$ that would be received at a location for a new base station transmission power $S_{2New}$ is as follows: $S_{1New}=S_{1RSS}+(S_2New-S_{2RSS})$, wherein $S_{1RSS}$ is an RSS value from the Table 1-1, 1-2 or 1-3 obtained during the collection of the RSS data and $S_{2RSS}$ is the known base station transmission power used during the collection of the RSS data.

For instance, if an exemplary base station transmission power setting $S_2$ of 10 dBm was used for the base station 10 to generate the RSS data in Tables 1-1, 1-2 and 1-3, then an increase in transmission power of the base station 10 to 15 dBm would produce a corresponding increase in the received signal strength at the measured locations of 5 dBm over the RSS values listed in the second column of the Tables 1-1, 1-2 and 1-3. For instance, the received signal strength at the location of the wireless terminal reference no. 1 in Table 1-1 from the base station 5 would be −55 dBm or 5 dBm more than the corresponding listed RSS value of −60 dBm.

Thus, in accordance with the invention, it is possible to determine the base station power level settings such that, for example, 95% of the locations in the coverage area 100 would receive a threshold signal strength of at least −90 dBm. Such a constraint is for explanation purposes only and it is possible to employ other constraints for determining the required coverage area according to the invention. For ease of discussion, the base stations 5–15 are limited to transmitting signals having power levels in the range of 0 dBm to 20 dBm in steps of 5 dBm.

For the following examples, it is assumed that the transmission power settings of the base stations 5, 10 and 15 that produced the RSS data listed in Tables 1-1, 1-2 and 1-3, are 10 10, 15 dBm, respectively, unless stated otherwise. At such transmission power settings, 17 of the 18 measurement locations in the service area of base station 5 would satisfy the RSS threshold requirement for signals transmitted by the base station 5 as indicated in column 1 of Table 1-1. The location of wireless terminal reference no. 18 would receive a signal strength of −91 dBm which is the only measured location that would fail to meet this threshold requirement. As a consequence, a coverage percentage of 94% (17/18× 100%) is achieved for the service area of base station 5 transmitting at 10 dBm. Thus, increasing the transmission power of base station 5 by one step to 15 dBm would result in the location of the wireless terminal no. 18 receiving a 5 dBm increase in signal strength to −86 dBm.

In a similar manner, the service area of base station 10 also has a coverage percentage of 94% because 17 of the 18 locations where wireless terminal measurements were taken meet or exceed the −90 dBm threshold requirement with that base station transmitting at 10 dBm as shown in the second column of Table 1-2. The location of wireless terminal reference no. 36 receives a signal strength of −92 dBm which does not satisfy the threshold requirement. Accordingly, as in the case of the base station 5, by increasing the transmission power of the base station 10 by 5 dBm to 15 dBm, a 100% coverage area is achieved.

However, as the base station transmission power settings are increased or decreased a corresponding change occurs in the relative size of the service areas as is described in the following example. In the service area of base station 15, 24 of the 26 locations at which RSS measurements were taken meet the received signal strength requirement with signals transmitted by the base station 15 at 15 dBm. Specifically, wireless terminal reference nos. 61 and 62 receive signal strengths of −92 dBm from signals generated by the base station 15. Thus, only 92% (24/26×100%) of the locations in the service area meet the threshold from base station 15.

Nevertheless, no change is required in the transmission power of base station 15 because the increase in transmission powers of the base stations 5 and 10 resulted in an increase in the service are as size of the base stations 5 and 10 which will cover the two locations in Table 1-3 not covered by the base station 15. In particular, the location where the wireless terminal reference no. 61 took its measurements would receive a signal strength of −86 dBm from base station 5 transmitting at 15 dBm, and the location at which the wireless terminal reference no. 62 took its measurements would also receive a signal strength of −86 dBm from base station 10 transmitting at 15 dBm. Since the relative size of the service areas provided by the respective base stations varies with transmission power, it is often desirable to use RSS measurements from a relatively greater number of locations in the coverage area than those listed in Tables 1-1, 1-2 and 1-3.

In addition, if a coverage percentage of 100% is detected for an existing power level setting, it is often advantageous to determine whether the corresponding base station transmission powers can be decreased while still meeting the coverage area threshold requirement. It is desirable to use the substantially lowest transmission power settings to obtain coverage of a given service area to avoid interference in neighboring service areas and facilitate channel reuse.

The following Table 2 lists the expected received signal strengths at the locations where the wireless terminals 40 took the RSS measurements listed in Tables 1- 1, 1-2 and 1-3 with the transmission power level of each base station 5, 10 and 15 set to 15 dBm. The values in the first and second columns of Table 2 correspond to a 5 dBm increase over the values in the respective first and second columns of Tables 1-1, 1-2 and 1-3 because of the increase of 5 dBm in the transmission powers of base stations 5 and 10 from 10 to 15 dBm. However, the entries in the third column of Table 2 are identical to the respective third columns of Tables 1-1, 1-2 and 1-3 as both concern the transmission power of base station 15 set to 15 dBm. A fourth column has been added in Table 2indicating the respective base stations that would provide the substantially strongest signals to corresponding wireless terminal locations for the table entries.

TABLE 2

Received Signal Strength with at the locations of the wireless terminals with the base stations transmitting signals at 15 dBm

| Location of Wireless Terminal Ref. No. | RSS from base station 5 (dBm) | RSS from base station 10 (dBm) | RSS from base station 15 (dBm) | Covered by Base Station |
|---|---|---|---|---|
| 1 | −55 | −109 | −100 | 5 |
| 2 | −27 | −104 | −95 | 5 |
| 3 | −27 | −98 | −90 | 5 |

TABLE 2-continued

Received Signal Strength with at the locations of the wireless terminals with the base stations transmitting signals at 15 dBm

| Location of Wireless Terminal Ref. No. | RSS from base station 5 (dBm) | RSS from base station 10 (dBm) | RSS from base station 15 (dBm) | Covered by Base Station |
|---|---|---|---|---|
| 4 | −55 | −92 | −86 | 5 |
| 5 | −72 | −83 | −83 | 5 |
| 6 | −72 | −83 | −72 | 5 |
| 7 | −55 | −92 | −76 | 5 |
| 8 | −27 | −98 | −83 | 5 |
| 9 | −27 | −104 | −90 | 5 |
| 10 | −55 | −109 | −96 | 5 |
| 11 | −65 | −110 | −93 | 5 |
| 12 | −55 | −105 | −86 | 5 |
| 13 | −55 | −100 | −76 | 5 |
| 14 | −64 | −93 | −65 | 5 |
| 15 | −71 | −102 | −72 | 5 |
| 16 | −72 | −107 | −83 | 5 |
| 17 | −76 | −111 | −92 | 5 |
| 18 | −85 | −113 | −92 | 5 |
| 19 | −83 | −72 | −83 | 10 |
| 20 | −92 | −55 | −86 | 10 |
| 21 | −98 | −27 | −90 | 10 |
| 22 | −104 | −27 | −95 | 10 |
| 23 | −109 | −55 | −10 | 15 |
| 24 | −109 | −55 | −96 | 10 |
| 25 | −104 | −27 | −90 | 10 |
| 26 | −98 | −27 | −83 | 10 |
| 27 | −92 | −55 | −76 | 10 |
| 28 | −83 | −72 | −72 | 10 |
| 29 | −93 | −65 | −65 | 10 |
| 30 | −100 | −55 | −76 | 10 |
| 31 | −105 | −55 | −86 | 10 |
| 32 | −110 | −65 | −93 | 10 |
| 33 | −111 | −76 | −92 | 10 |
| 34 | −107 | −72 | −83 | 10 |
| 35 | −102 | −72 | −72 | 10 |
| 36 | −113 | −87 | −93 | 10 |
| 37 | −72 | −83 | −83 | 5 |
| 38 | −83 | −72 | −83 | 10 |
| 39 | −83 | −72 | −72 | 15 |
| 40 | −72 | −83 | −72 | 15 |
| 41 | −65 | −93 | −65 | 15 |
| 42 | −76 | −86 | −55 | 15 |
| 43 | −86 | −76 | −55 | 15 |
| 44 | −93 | −65 | −65 | 15 |
| 45 | −107 | −72 | −83 | 10 |
| 46 | −102 | −72 | −72 | 15 |
| 47 | −96 | −76 | −55 | 15 |
| 48 | −90 | −83 | −27 | 15 |
| 49 | −83 | −90 | −27 | 15 |
| 50 | −76 | −96 | −55 | 15 |
| 51 | −67 | −102 | −72 | 5 |
| 52 | −72 | −107 | −83 | 5 |
| 53 | −83 | −109 | −83 | 15 |
| 54 | −83 | −104 | −72 | 15 |
| 55 | −86 | −100 | −55 | 15 |
| 56 | −90 | −95 | −27 | 15 |
| 57 | −95 | −90 | −27 | 15 |
| 58 | −100 | −86 | −55 | 15 |
| 59 | −104 | −83 | −72 | 15 |
| 60 | −109 | −83 | −83 | 10 |
| 61 | −86 | −113 | −92 | 5 |
| 62 | −113 | −86 | −92 | 10 |

II. Base Station Service Area Coverage and Overlaps

Overlaps of base station service areas permit hand-offs of communications with a wireless terminal 40 that is moving from one service area to the other. One method for establishing the overlaps is to employ a hand-off hysteresis limit. A hand-off hysteresis limit establishes overlaps in service areas as regions that can receive signal strengths from two or more base stations that all satisfy a threshold RSS criteria as well as being within a particular limited range of one another, such as, for example, 15 dB. Thus, for example, communication between the system 1 in FIG. 2 and a wireless terminal 40 is provided by a first base station provides the substantially strongest received signal strength at the wireless terminal and if the received signal strength satisfies a threshold requirement of −85 dBm. This same wireless terminal location can also be covered by a second base station if the signal strength received at the location is at least −85 dBm as well as within the hand-off hysteresis of 15 dB of the signal strength received from the first base station. As a result, a wireless terminal 40 traversing that location can have its communication with the first base station handed-off to the second base station.

Table 3 is based on the single strengths listed in Table 2 and includes the base stations that cover the respective regions assuming a hysteresis hand-off limit of 15 dB. In Table 3, a "1" denotes that the corresponding region is covered by the particular base station and a "0" denotes that no coverage is provided to the region by the particular base station. For instance, at the location of wireless terminal reference no. 14 in Table 2, the received signal strength from base station 10 is −93 dBm which is below −85 dBm, therefore, this base station would not cover the location of wireless terminal reference no. 14 as indicated by the "0"0 in Table 3. However, the received signal strengths from base stations 5 and 15 are −64 and −65 dBm, respectively, which are both above the threshold −85 dBm and within 15 dBm of one another. Thus, base stations 5 and 15 would covert the region 24 as indicated by the "1's" in Table 3.

Conversely, Table 2 shows that at the location of the wireless terminal no. 30, the received signal strength is greater than −85 dBm from base stations 10 and 15. However, only base station 10 is considered to service that location because the difference in the received power from base stations 10 and 15 is 21 dB which is greater than the 15 dB limit. Thus, in Table 3, location of the wireless terminal no. 30 is indicated as serviced only by the base station 10.

TABLE 3

Location coverage by base stations 5, 10 and 15

| Location of Wireless Terminal Ref. No. | 5 | 10 | 15 |
|---|---|---|---|
| 1 | 1 | 0 | 0 |
| 2 | 1 | 0 | 0 |
| 3 | 1 | 0 | 0 |
| 4 | 1 | 0 | 0 |
| 5 | 1 | 1 | 1 |
| 6 | 1 | 1 | 1 |
| 7 | 1 | 0 | 0 |
| 8 | 1 | 0 | 0 |
| 9 | 1 | 0 | 0 |
| 10 | 1 | 0 | 0 |
| 11 | 1 | 0 | 0 |
| 12 | 1 | 0 | 0 |
| 13 | 1 | 0 | 0 |
| 14 | 1 | 0 | 1 |
| 15 | 1 | 0 | 1 |
| 16 | 1 | 0 | 1 |
| 17 | 1 | 0 | 0 |
| 18 | 1 | 0 | 1 |
| 19 | 1 | 1 | 1 |
| 20 | 0 | 0 | 1 |
| 21 | 0 | 0 | 1 |
| 22 | 0 | 1 | 0 |
| 23 | 0 | 0 | 1 |
| 24 | 0 | 1 | 0 |
| 25 | 0 | 1 | 0 |
| 26 | 0 | 1 | 0 |
| 27 | 0 | 1 | 0 |
| 28 | 1 | 1 | 1 |
| 29 | 0 | 1 | 1 |

TABLE 3-continued

Location coverage by base stations 5, 10 and 15

| Location of Wireless Terminal Ref. No. | 5 | 10 | 15 |
|---|---|---|---|
| 30 | 0 | 1 | 0 |
| 31 | 0 | 1 | 0 |
| 32 | 0 | 1 | 0 |
| 33 | 0 | 1 | 0 |
| 34 | 0 | 1 | 1 |
| 35 | 0 | 1 | 1 |
| 36 | 0 | 1 | 0 |
| 37 | 1 | 1 | 1 |
| 38 | 1 | 1 | 1 |
| 39 | 1 | 1 | 1 |
| 40 | 1 | 1 | 1 |
| 41 | 1 | 0 | 1 |
| 42 | 0 | 0 | 1 |
| 43 | 0 | 0 | 1 |
| 44 | 0 | 1 | 1 |
| 45 | 0 | 1 | 1 |
| 46 | 0 | 1 | 1 |
| 47 | 0 | 0 | 1 |
| 48 | 0 | 0 | 1 |
| 49 | 0 | 0 | 1 |
| 50 | 0 | 0 | 1 |
| 51 | 1 | 0 | 1 |
| 52 | 1 | 0 | 1 |
| 53 | 1 | 0 | 1 |
| 54 | 1 | 0 | 1 |
| 55 | 0 | 0 | 1 |
| 56 | 0 | 0 | 1 |
| 57 | 0 | 0 | 1 |
| 58 | 0 | 0 | 1 |
| 59 | 0 | 1 | 1 |
| 60 | 0 | 1 | 1 |
| 61 | 1 | 0 | 0 |
| 62 | 0 | 0 | 0 |

The percentage of the coverage area 100 serviced by the respective base stations as well as the service area overlap between a pair of base stations can also be determined from Table 3. The coverage area percentage can be determined by the number of locations of the coverage area that are indicated as serviced by a particular base station. For instance, the number of regions serviced by the base station 5 in Table 3 is 28. Thus, the coverage area percentage serviced by the base station 5 is 45% (28 regions/62 total locations).

In a similar manner, the service area overlap percentage between base stations can be determined. Sixteen locations of the 28 regions covered by base station 5 are covered by other base stations yielding a coverage overlap percentage of 57% (16/28×100%). Likewise the coverage overlap percentage between base stations 5 and 10 occurs at eight locations, which is 13% (8/62×100%) of the coverage area 100.

The coverage area percentage and coverage overlap indicate the effectiveness of each base station in providing service to the coverage area. For the example, the coverage area and overlap percentages are contained in the following Table 4.

TABLE 4

| base stations | locations covered | overlap locations | Coverage area (%) | Coverage overlap (%) |
|---|---|---|---|---|
| 5 | 28 | 16 | 45 | 57 |
| 10 | 27 | 15 | 44 | 56 |
| 15 | 36 | 21 | 58 | 58 |

III. Removal of Base Stations from a System

Although Table 3 illustrates that service can be provided to the coverage area 100 using three base stations, it is possible to determine whether such coverage or a lesser acceptable coverage could be provided using a smaller number of base stations in the event that a base station becomes inoperative whether for routine maintenance, repair, reduction in the number of base stations in the coverage area or otherwise. Such a determination can be made from the RSS measurements taken by wireless terminals 40 for the three base stations 5–15 listed in Table 1. It is possible to perform the determination without the need for additional collection of RSS measurements using the smaller number of base stations.

The determination of whether the communication system 1 of FIG. 2 can operate with a reduced number of base stations can be performed by determining the required transmission power of the remaining base stations, if any, that could provide coverage to the service area of the base station to be removed. Moreover, such a determination would also have to include whether the required transmission powers would produce unacceptable interference in the other regions of the coverage area 100.

An exemplary method for determining whether the system 1 can operate with a reduced number of base stations is to perform the previously described method for adjusting the base station transmission power level in Section I excluding the RSS measurements of signals transmitted by the particular base station to be removed. This transmission power determination should be made such that the remaining base stations can provide an acceptable level of service coverage to the desired coverage area 100. In addition, this method can also be performed for each base station to test the resulting coverage with each of the base stations 5–15 individually removed to identify if the coverage area 100 can be serviced with a smaller number of base stations in the system. After a base station has been removed and the system is operating with a reduced number of base stations, it may be desirable to further obtain intermittent RSS measurements to determine if further transmission power adjustment of the remaining base stations would be advantageous. At such time, it would be further advantageous to update the neighbor lists and isolation values as is described in detail below in Section V.

IV. Addition of Base Stations to a System

It is desirable to add a new base station to an existing wireless communication system when, for example, the average number of wireless communications in the coverage area 100 approaches or exceeds the system's call capacity. The addition of a new base station in the system would provide an increase in call capacity. The position of a new base station an be proximate to those base stations that handle relatively high call traffic. The transmission power settings of such a new base station, as well as the existing base stations, can then be determined by a method in accordance with the invention. Moreover, at such time, it would be also desirable to update the neighbor lists and isolation values for the system 1 with the added base station, as described below in section V.

An exemplary technique to make the transmission power determination includes the transmission power adjustment method previously described in Section I. According to this technique, a new base station is allowed to transmit a signal having a beacon frequency without handling any calls for an initial period of time. During this initial period, the other base stations maintain their existing transmission power settings. Also, during this initial period, RSS measurements are obtained from the wireless terminals 40 including measurements regarding the beacon signal of the new base station.

After a sufficient number of RSS measurements are collected to characterize the signal propagation in the coverage area with the new base station, the base station transmission power settings including that for the new base station are adjusted to establish coverage of respective service areas by the previously described method in Section I. The new base station is then activated for completing calls. Thus, a new base station can advantageously be incorporated into an existing system without substantially disrupting the operation of that system and without requiring costly system modeling and field testing by installers.

The duration of the initial period and the number of RSS measurements required to sufficiently characterize the coverage area for incorporating a base station is significantly dependent on the type of system, whether an indoor or outdoor system, and the coverage area environment. However, an exemplary number of RSS measurements that could be used to adjust the base station transmission power settings when a new base station is installed is on the order of hundreds of measurements.

An alternative method for determining the transmission power of the added base station is to provide a frequency assignment for the new base station and allow it to establish communications with wireless terminals in the area using a relatively low transmission power. As RSS data is collected for the new base station and the corresponding interference effects caused to neighboring base stations is determined, its power level can be adjusted accordingly. Such a technique is advantageous in that it allows a newly installed base station to provide communications without the previously described initial non-communication period. The initial relatively low power setting employed for a new base station is substantially dependent on the type of system and its proximity to neighboring base stations, however, such powers can be on the order of 20 dBm for an exemplary outdoor system and 1 dBm for an exemplary indoor system.

V. Isolation Values, Neighbor Lists and Channel Reuse

The RSS measurements and location coverage indicated in the respective Tables 1-1 to 1-3 can be used to generate isolation values in accordance with the invention. Isolation values are a measure of radio frequency isolation on a channel at a base station, or a wireless terminal at a location, from other signals from other base stations or wireless terminals that would interfere if they were permitted to transmit on the same channels. In other words, isolation values indicate channel interference by the strength of a received signal at a base station, or a wireless terminal at a location, relative to an interfering signal strength from other base stations or wireless terminals that would occur if they used the same channels.

Such channel interference can be up-link or down-link interference or a combination of these interferences. Down-link interference is channel interference received at locations serviced by a first base station caused from signals transmitted by other base stations. Up-link interference is interference at the base stations caused from signals transmitted by wireless terminals in locations of the coverage area that are not serviced by that base station.

Figure 3:
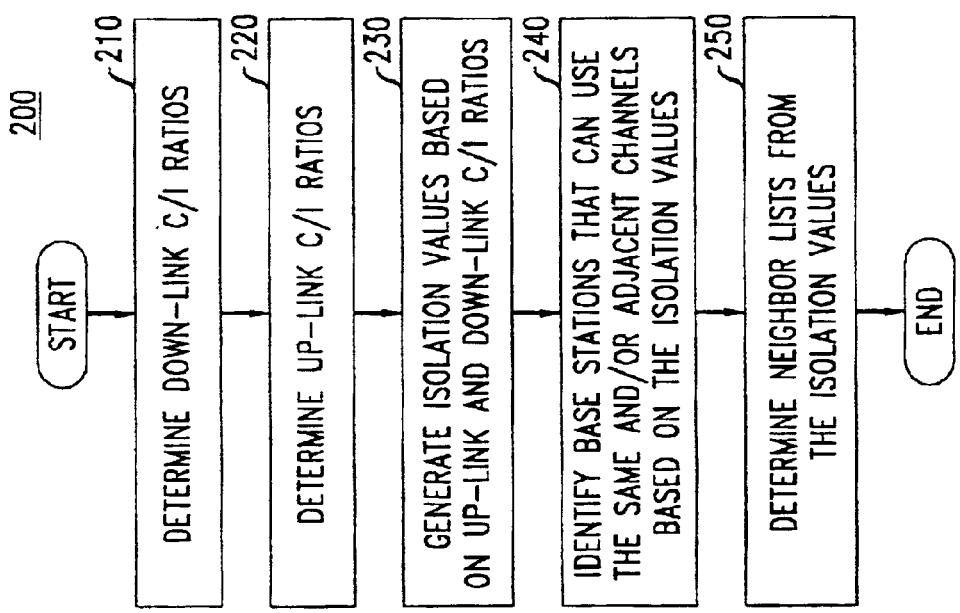
FIG. 3 illustrates a flow diagram of an exemplary process in accordance with the invention for determining frequency reuse schemes and neighbor lists based on isolation values for the system arrangement of FIG. 2.

FIG. 3 illustrates an exemplary method 200 for determining base station isolation values based on up-link and down-link isolation values. The up-link and down-link isolation values determined according to the method 200 are further based on carrier-to-interference (C/I) ratios. A large C/I ratio indicates a signal that is substantially isolated from channel interference while a small C/I ratio indicates a signal experiencing substantial channel interference. Thus, large C/I ratio values between conventional cellular base stations that are, for example, greater than approximately 18 dB, indicates that such base stations can use the same channel while small C/I ratio values between base stations, such as, for example, less than approximately 0 dB, indicate that the base stations are neighbors as is described below with regard to Table 8. It should be readily understood that carrier and interference signals for this discussion occur on the same channel or frequency.

The method 200 is described with respect to the system of FIGS. 1 and 2 with the transmission power settings of 10, 10 and 15 dBm for the base stations 5, 10 and 15, respectively. As previously described, the locations of the wireless terminals 40 where the RSS measurements were collected that are in the service area 105 of the base station 5 are listed in Table 1-1. Likewise, the measurement locations listed in Tables 1-2 and 1-3 are serviced by the base stations 10 and 15, respectively.

Referring to FIG. 3, down-link isolation values, such as service area down-link C/I ratio values, are determined in step 210. A service area down-link C/I ratio is a measure of interference on a down-link portion of a channel at locations serviced by a particular base station from signals transmitted on that channel by other base stations. An exemplary method for determining a service area down-link C/I ratio value includes: 1) determining down-link C/I ratios for the individual locations in a base station service area; and 2) using a particular quality measure, determining the service area down-link C/I ration value based on these identified ratios.

An exemplary technique for determining the down-link C/I ratio for an individual location serviced by a first base station with interference from a second base station is to compute the difference in signal strengths $S_2$ from the first and second base stations at the location. For instance, Table 5 gives an interference distribution of the C/I ratios that would occur at locations in the service area of base station 5 if the base stations 10 and 15 transmitted on the same channel. Table 5 lists only those locations that are serviced by base station 5 as indicated in Table 1-1.

TABLE 5

Down-link C/I ratios at locations serviced by the base station 5

| Location of Wireless Terminal Ref. No. | Int. from base station 10 (dB) | Int. from base station 15 (dB) |
|---|---|---|
| 1 | 54 | 40 |
| 2 | 77 | 63 |
| 3 | 71 | 58 |
| 4 | 37 | 26 |
| 5 | 11 | 6 |
| 6 | 11 | −5 |
| 7 | 37 | 16 |
| 8 | 71 | 51 |
| 9 | 77 | 58 |
| 10 | 54 | 36 |
| 11 | 45 | 23 |
| 12 | 50 | 26 |
| 13 | 45 | 16 |
| 14 | 28 | −5 |
| 15 | 30 | −5 |
| 16 | 35 | 6 |
| 17 | 35 | 10 |
| 18 | 27 | 1 |

A suitable quality measure for determining the service area down-link C/I ratio value is, for example, the fifth percentile of the interference distribution. The fifth percentile of the distribution refers to 5% of the locations in the service area that have the lowest determined C/I ratios which corresponds to approximately one location in the 18 locations serviced by base station 5 (1/18×100%≈5%). Accordingly, the service area down-link C/I ratio value for the base station 5 would be 11 and −5 dB for interference from the base stations 10 and 15, respectively. In particular, the substantially lowest single down-link C/I ratio that would be caused by the base station 10 is 11 dB at locations of wireless terminal reference nos. 5 or 6. Likewise, the substantially lowest single down-link C/I ratio caused by the base station 15 is −5 dB at locations of wireless terminal location nos. 6, 14 or 15.

The service area down-link C/I ratio values or down-link isolation values for the base stations 10 and 15 service areas can be obtained in a substantially identical manner as that previously described for the base station 5. Table 6 provides a correlation of the down-link C/I ratio values for the respective base station service areas in this example.

TABLE 6

Down-link C/I ratios for the locations serviced by the respective base stations (dB)

| Base stations | 5 | 10 | 15 |
|---|---|---|---|
| 5 | 0 | 11 | −5 |
| 10 | 11 | 0 | −5 |
| 15 | −6 | −6 | 0 |

Referring back to FIG. 3, after the service area down-link C/I ratio values are obtained in step 210, the method 200 obtains the up-link base station isolation or C/I ratio values in step 220. An up-link base station C/I interference ratio measures the channel interference to a signal from a wireless terminal in a location serviced by a first base station caused by wireless terminals in locations serviced by a second base station. Such a determination can be made for each location in the first base station's service area. For this example, up-link interference ratios for each of the 18 locations serviced by the base station 5 are determined based on the interference that would be caused by wireless terminals in each of the 18 locations serviced by the base station 10. A suitable method to obtain the cumulative up-link C/I ratios is substantially similar to the method used to obtain the cumulative down-link C/I ratios and is described in greater detail below with regard to FIG. 4. Table 7 lists the up-link C/I interference ratio values for each of the base stations' service areas.

TABLE 7

Up-link C/I ratios for the base stations (dB)

| Base stations | 5 | 10 | 15 |
|---|---|---|---|
| 5 | 0 | 17 | −6 |
| 10 | 17 | 0 | −6 |
| 15 | 0 | 0 | 0 |

After the up-link C/I ratio values are determined in step 220, the method 200 of FIG. 3 generates the base station isolation values based on the determined down-link and up-link C/I values, in step 230, using a quality measure. A suitable quality measure for generating the isolation values is, for example, to use the substantially minimum entry of the down-link and up-link C/I values listed in Tables 6 and 7 to yield the following isolation values Table 8.

TABLE 8

Isolation values for the base stations (dB)

| Base stations | 5 | 10 | 15 |
|---|---|---|---|
| 5 | 0 | 11 | −6 |
| 10 | 11 | 0 | −6 |
| 15 | −6 | −6 | 0 |

After the isolation values are generated in step 230, the neighbor lists and channel reuse determinations are performed in steps 240 and 250. With regard to channel reuse in step 240, if a substantially minimum isolation value is, for example, 10 dB to permit two base stations to use the same channel, then base stations 5 and 10 can use the same channel as their isolation value indicating the C/I ratio between them and their locations is 11 dB. However, if the requirement were 18 dB, then no channel reuse would be permitted in the system 1. In a similar manner, if a requirement of approximately 1 dB is used in order for two base stations to use adjacent frequency channels, then the base stations 5 and 10 can use adjacent channels. With regard to determining neighbor lists in step 250, if an isolation or C/I requirement of, for example, 0 dB is used then base stations 5 and 10 are neighbors of base station 15 for hand-off but base stations 5 and 10 are not neighbors to each other, as is seen in Table 8.

The previously described quality measures chosen to generate the C/I ratio values and the isolation values are representative and not intended to be a limitation of the invention. It should be readily understood that other quality measures can be employed in accordance with the invention including averaging of all or a portion of the C/I values. Moreover, numerous other methods of manipulating the individual C/I ratio values of the locations can be used in determining the isolation values in accordance with the invention including the use of just up-link or down-link C/I ratio values. In addition, more intricate combinations of the resulting isolation values than is represented in Table 8 can also be used such as employing separate isolation values representing the up-link and down-link interference. It is also possible to include criteria in addition to the isolation values for allocating channels such as, for example, a bias to communicate with a local private wireless communication system that is nearby a macro-cellular system.

Figure 4:
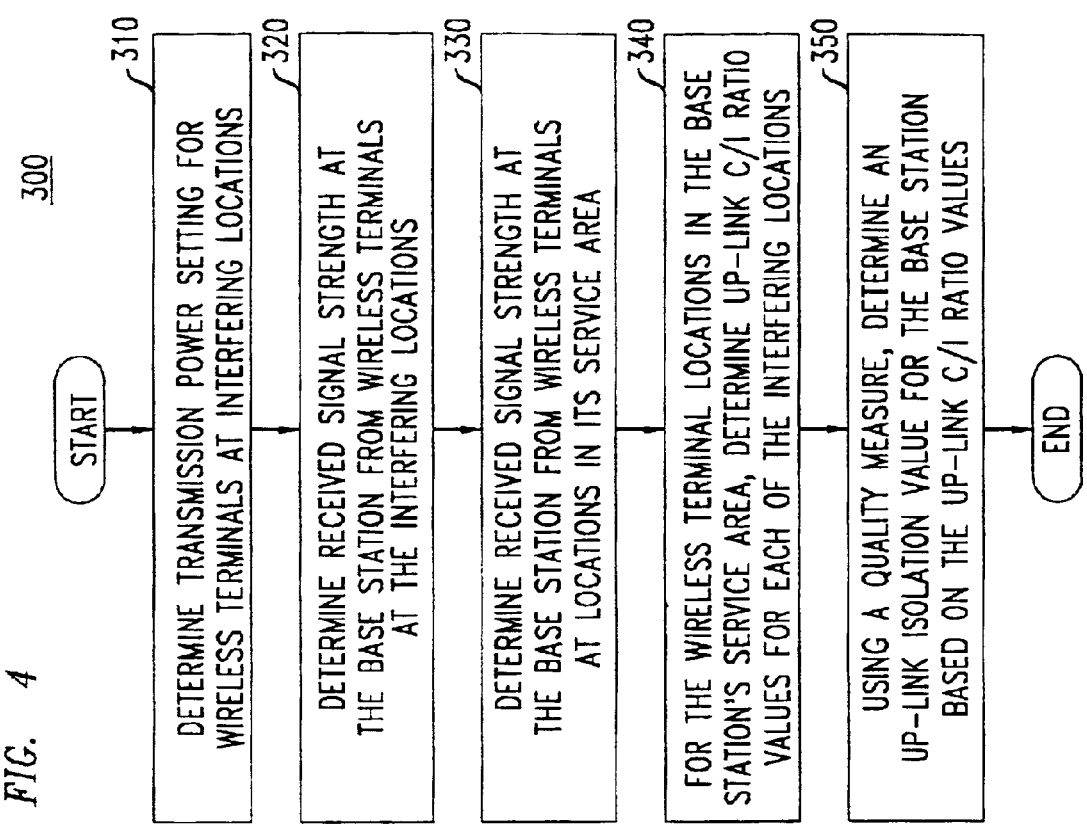
FIG. 4 illustrates a flow diagram of determining up-link isolation values for a base station in the system arrangement of FIG. 2.

An exemplary method 300 for determining an up-link C/I ratio value for a first base station is shown in FIG. 4. Referring to FIG. 4, interfering wireless terminal transmission powers in a second base station's service area are determined in step 310. Transmission power can be determined for each measurement location in the service area. It is possible for wireless terminal to transmit at a fixed power, such as 0.6 W in conventional portable cellular telephones. However, also in conventional systems, such as those conforming to the previously mentioned TIA IS-136 standard, the wireless terminal transmission power can be controlled with control signals from the base station to which the wireless terminal is communicating. The base station controls the wireless terminal's power in this manner such that it receives a substantially constant signal strength as the wireless terminal moves within the service area.

Thus, an exemplary technique for determining the wireless terminal transmission powers at the locations in the second base station's service area is to compute the transmission power required to provide the second base station with a particular signal strength such as, for example, −90 dBm based on a path loss between the location and the base station. For such a computation, it is possible to determine path loss as the difference between the base station's transmission power and the measured received signal strengths $S_1$ which are listed in the Tables 1-1, 1-2 and 1-3. If the path loss is substantially low, such as when the location is in close proximity to the base station, a lower limit of the wireless terminal's transmission power is reached and a minimum power of, for example, −4 dBm can be used.

After the interfering wireless terminal transmission powers are determined in step 310, the corresponding received signal strengths at the first base station from those transmission powers are determined in step 320. This determination is based on the computed path losses from those locations to the first base station in Table 1 in a similar manner to that used for interfering transmission powers as determined in step 310. Then, in step 330, the signal strength that would be received by the first base station from wireless terminals at locations within its own service area is determined.

If the wireless terminals are power controlled, then the first station would receive a signal strength of substantially constant power, such as −90 dBm. However, if the transmission power to provide such a signal strength is less than the minimum wireless terminal transmission power or if the wireless terminals are transmitting at a constant power, then the power reaching the base station can be determined in substantially the same manner as described above with regard to step 320. Such a determination would be based on the transmission power and the measured path loss between the locations and the first base station.

After the signal strengths are determined in steps 320 and 330, then, for each location in the first base station's service area, up-link C/I ratio values are computed based on interfering signals that would be generated by interfering wireless terminals from each of the locations in the second base station's service area. This computation is performed in step 340. For instance, if base station 5 that services the 18 locations for which RSS data was collected was the first base station, and base station 10 that services the 18 other locations for which RSS data was collected was the second base station, then, in step 340, 18 up-link ratio values would be determined for each of the 18 locations in the service area of base station 5 for a total of 324 (18×18) values. Then, in step 350, a quality measure is used to determine a single up-link base station C/I ratio or up-link isolation value for the first base station's service area based on the up-link C/I ratio value computations of step 350. The method 300 can be repeated for each base station in the communication system.

In the example, if the quality measure of the fifth percentile is used then the determined base station up-link isolation values for each of the three base stations 5, 10 and 15 would be those listed in Table 7. In a substantially similar manner to the service area down-link C/I values, the particular quality measured used to generate the up-link C/I values is not critical to practicing the method of the invention. Accordingly, it should be readily understood that many other types of data manipulations can be performed to generate the up-link C/I and isolation values and that more than one value can be used to represent interference from base station service areas. In particular, unlike the down-link C/I values, the up-link C/I values need not correlate interference from wireless terminals based on the base station service areas in which they would be operating.

Although several embodiments of the invention have been described in detail above, many modifications can be made without departing from the teaching thereof. All of such modifications are intended to be encompassed within the following claims. For instance, it is possible to use other methods and techniques than those previously described to determine system organization parameters in accordance with the invention based on path loss-related characteristic measurements from the base stations and/or wireless terminals.

It is claimed:

1. A method of calculating a system organization parameter for a wireless communication system, the method comprising:
   intermittently measuring path loss-related characteristic between a base station and one or more wireless terminals of the wireless communication system in substantial absence of correlation to an absolute geographic location regarding where the path loss-related characteristic measurement occurs thereby forming a measured path loss-related characteristic measurement, wherein the one or more wireless terminals operate as normal wireless terminals in the wireless communication system;
   determining a signal propagation characterization that relates the measured path loss-related characteristic measurement to the base station and the geographic location of the one or more wireless terminals; and
   altering the system organization parameter for the wireless communication system based on the signal propagation characterization.

2. The method of claim 1 wherein altering includes adjusting the system organization parameter for the wireless communication system.

3. The method of claim 1 further comprising establishing communication between the base station and the one or more wireless terminals based on the system organization parameter that has been determined.

4. The method of claim 1 wherein the path loss-related characteristic is a measurement of signal propagation.

5. The method of claim 1 wherein the path loss-related characteristic is at least partially dependent on one of path-loss, bit error rate, word error rate, frame error rate and received signal strength of a signal transmitted at a known power level.

6. The method of claim 1 wherein the path loss-related characteristic is dependent on measurements taken over a period of time.

7. The method of claim 1 wherein measuring further comprises determining received strength of a signal at the wireless terminal corresponding to a signal transmitted by the base station.

8. The method of claim 1 wherein the wireless communication system further comprises a plurality of base stations.

9. The method of claim 8 wherein the system organization parameter is a neighbor list, a list of base stations that can reuse channels, a wireless terminal access parameter, a wireless terminal transmission power setting, or a base station transmission power setting.

10. The method of claim 8 wherein the plurality of base stations provide service to respective areas creating a respective service area for each base station, and wherein the system organization parameter identifies an overlap zone where the service area of one base station overlaps the service area of another base station.

11. The method of claim 8 further comprising:
   determining an isolation value for a first of the plurality of base stations based on up-link interference caused by an interfering wireless terminal in a coverage area not serviced by the first base station; and
   determining the system organization parameter based on the isolation value.

12. The method of claim 11 wherein the isolation value for the first of the plurality of base station is dependent on measurements corresponding to the interfering wireless terminal.

13. The method of claim 12 wherein the isolation value for the first of the plurality of base stations is further dependent on measurements corresponding to a wireless terminal in a coverage area serviced by the first base station of the plurality of base stations.

14. The method of claim 12 wherein the isolation value is dependent on measurements corresponding to a plurality of interfering wireless terminals in a coverage area serviced by a second base station of the plurality of base stations.

15. The method of claim 12 wherein the system organization parameter relates respectively to channels useable by the plurality of base stations.

16. The method of claim 12 wherein the system organization parameter identifies a neighbor base station that is operable to receive a communication hand-off from a particular base station.

17. The method of claim 12 wherein the isolation value is dependent on a value for an up-link carrier-to-interference ratio.

18. The method of claim 8 further comprising determining a first isolation value for a first coverage area of a first base station of the plurality of base stations based on down-link interference caused by a second base station of the plurality of base stations.

19. The method of claim 18 wherein the system organization parameter relates to channels useable by at least one of the plurality of base stations.

20. The method of claim 18 wherein the system organization parameter identifies a neighbor base station that is operable to receive a communication hand-off from a particular base station.

21. The method of claim 18 wherein the first isolation value is dependent on a value for a down-link carrier-to-interference ratio.

22. The method of claim 18 further comprising determining a second isolation value for the first base station based on up-link interference cause by an interfering wireless terminal in a second coverage area serviced by the second base station, the second isolation value dependent on the path loss-related characteristic measured between the interfering wireless terminal, and wherein the system organization parameter depends on the first isolation value and the second isolation value.

23. The method of claim 22 wherein the first isolation value and the second isolation value are further dependent on measurements corresponding to a wireless terminal in the first coverage area serviced by the first base station.

24. The method of claim 22 wherein the first isolation value and the second isolation value are dependent on a value for an up-link carrier-to-interference ratio.

25. The method of claim 1 wherein the system organization parameter is a transmission power setting for the base station.

26. The method of claim 25 wherein the transmission power setting is determined upon an addition of a base station to the wireless communication system or upon a deactivation of a base station in the wireless communication system.

27. In a wireless communication system having one or more base stations that serves a geographic service area, a method for establishing communication over at least one channel between the one or more wireless terminals and the one or more base stations utilizing a system organization parameter determined according to a method comprising:

intermittently measuring a path loss-related characteristic between the one or more wireless terminals and the one or more base stations in substantial absence of correlation to an absolute geographic location regarding where the path loss-related characteristic measurements are taken, the one or more wireless terminals positioned at one or more locations within the geographic service area, wherein the one or more wireless terminals operate as normal wireless terminals in the wireless communication system;

establishing a characterization of signal propagation for signals generated within the geographic service area based on the measured path loss-related characteristic relating the measured path-loss characteristic between the one or more base stations and the geographic locations of the one or more wireless terminals; and altering the system organization parameter based on the characterization of signal propagation, wherein the system organization parameter includes a transmission power setting for the one or more base stations.

28. A method for determining at least one system organization parameter for a wireless communication system having at least one base station arranged to serve at least one wireless terminal in a geographic area, the method comprising:

intermittently measuring a path loss-related characteristic between a plurality of wireless terminals and the base station thereby creating a measured path loss-related characteristic, wherein the measuring is performed in substantial absence of correlation to an absolute geographic location regarding where the measurements were taken, and wherein the wireless terminals operate as normal wireless terminals in the wireless communication system;

establishing a characterization of signal propagation for signals generated within the geographic area based on the measured path loss-related characteristics; and adjusting at least one system organization parameter based on the characterization of signal propagation.

29. A method of calculating a system organization parameter for a wireless communication system, the method comprising:

receiving a data packet from a wireless terminal at a plurality of base stations, wherein the wireless terminal operates as normal wireless terminal in the wireless communication system;

intermittently measuring and storing a path loss-related characteristic for the data packet received at each of the plurality of base stations thereby creating a measured path loss-related characteristic and a stored path loss-related characteristic respectively, wherein the measuring is performed in substantial absence of correlation to an absolute geographic location, the path loss-related characteristics stored in a form relating the measured path-loss characteristic between the wireless terminal and the plurality of base stations;

altering the system organization parameter from the stored path loss-related characteristics in substantial absence of correlation to the absolute geographic location regarding where the measuring was performed, wherein altering the system organization parameter includes adjusting a base station transmission power setting; and operating the wireless communication system in accord with the system organization parameter.

30. The method of claim 29 further comprising:
receiving a plurality of data packets approximately simultaneously so that the location of the wireless terminal remains approximately unchanged between receipt of the plurality of data packets; and
wherein measuring and storing includes correlating each received data packet with each other received data packet.

31. The method of claim 30 further comprising repeating the step of receiving and the step of measuring and storing with the wireless terminal at a plurality of locations in an aggregate service area of the plurality of base stations so as to create a table relating the path loss-related characteristic of the plurality of base stations to the plurality of locations, the number of the plurality of locations being greater than the number of base stations.

32. The method of claim 29 wherein the path loss-related characteristic is a measurement of signal strength for received data packets, a characterization of path losses for received data packets, a measurement of signal propagation, or an isolation value.

33. The method of claim 29 wherein the path loss-related characteristic is at least partially dependent on one of path loss, bit error rate, word error rate, frame error rate, and received signal strength of a signal transmitted at a known power level.

34. The method of claim 29 wherein the system organization parameter is a neighbor list, a list of base stations that can reuse channels, a wireless terminal access parameter, a wireless terminal transmission power setting, a base station transmission power setting, or an identification of overlap of service areas.

* * * * *

UNITED STATES PATENT AND TRADEMARK OFFICE
CERTIFICATE OF CORRECTION

| | |
|---|---|
| PATENT NO. | : 7,043,254 B2 |
| APPLICATION NO. | : 10/082402 |
| DATED | : May 9, 2006 |
| INVENTOR(S) | : Kapil K. Chawla, Michael Jeffrey Dunn and Reinaldo A. Valenzuela |

It is certified that error appears in the above-identified patent and that said Letters Patent is hereby corrected as shown below:

Title Page: (item 56)
   Under "Other Publications" for Wolfgang, Larry D., delete "Arnateurs" and insert -- Amateurs --.

(Item 62) Under "Related U.S. Application Data" delete "Division of application No. 08/628,214 filed on Apr. 4, 1996." and insert -- Division of application No. 08/628,214 filed on Apr. 4, 1996, now Patent No. 6,496,700. --

Column 5, Line 36, delete "onRSS" and insert therefore -- on RSS --.

Columns 12 and 13, Table 3, delete lines 18, 20, 21, 36, and 61:
"18   1   0   1"   and insert   -- 18   0   0   1 --
"20   0   0   1"   and insert   -- 20   0   1   0 --
"21   0   0   1"   and insert   -- 21   0   1   0 --
"36   0   1   0"   and insert   -- 36   0   0   0 --
"61   1   0   0"   and insert   -- 61   0   0   0 --

Column 16, Table 5, delete line 18:
"18       27   1"   and insert   -- 18       28   2 --

Signed and Sealed this

Nineteenth Day of September, 2006

JON W. DUDAS
*Director of the United States Patent and Trademark Office*